US006872133B2

(12) United States Patent
Lee et al.

(10) Patent No.: US 6,872,133 B2
(45) Date of Patent: Mar. 29, 2005

(54) WAVE SAW BLADE

(75) Inventors: Seung Weon Lee, Kyungki-do (KR); Yong Hyun Park, Seoul (KR); Jong Suk Choi, Seoul (KR); Eui Seok Jung, Kyungki-do (KR)

(73) Assignee: Ehwa Diamond Industrial Co., Ltd. (KR)

( * ) Notice: Subject to any disclaimer, the term of this patent is extended or adjusted under 35 U.S.C. 154(b) by 0 days.

(21) Appl. No.: 10/626,290

(22) Filed: Jul. 24, 2003

(65) Prior Publication Data

US 2004/0242138 A1 Dec. 2, 2004

(30) Foreign Application Priority Data

May 30, 2003 (KR) ................................ 10-2003-0034821

(51) Int. Cl.[7] ................................................ B23F 21/03

(52) U.S. Cl. ....................... 451/546; 451/542; 451/547; 125/15

(58) Field of Search ................................ 451/541, 542, 451/543, 546, 547, 548; 125/15, 18, 22; 83/663, 664, 835

(56) References Cited

U.S. PATENT DOCUMENTS 3,939,612 A * 2/1976 Peterson ..................... 451/546
4,407,178 A * 10/1983 Storzer ........................ 83/835
4,624,237 A 11/1986 Inoue
5,471,970 A * 12/1995 Sakarcan ..................... 125/15
6,071,185 A * 6/2000 Genau et al. ............... 451/541
6,277,017 B1 8/2001 Ji
6,460,532 B1 * 10/2002 Park ........................ 125/13.01

FOREIGN PATENT DOCUMENTS

DE 606001 A 11/1934
WO WO 92/01542 A 2/1992

* cited by examiner

*Primary Examiner*—Dung Van Nguyen
(74) *Attorney, Agent, or Firm*—Webb Ziesenheim Logsdon Orkin & Hanson, P.C.

(57) ABSTRACT

A saw blade for cutting hard workpieces, such as concrete or stone, characterized by improvement of the shape of a shank of the saw blade providing a plurality of cutting tips of the saw blade with a rotational force while the cutting tips are securely attached to the shank. The saw blade comprises a disc-shaped shank having an insertion hole formed at the center thereof, through which a rotating shaft of an electric-powered tool is inserted, and wave-shaped portions formed over a prescribed portion of the radius of the disc-shaped shank, and a plurality of cutting tips attached to the outer circumference of the shank for cutting a workpiece. The wave-shaped portions are spaced a prescribed distance from each other and alternately arranged on the front and rear surfaces of the disc-shaped shank. The prescribed portion of the radius of the disc-shaped shank is at a distance from the center of the insertion hole. The cutting tips contain particles of high hardness.

3 Claims, 7 Drawing Sheets

A-A'

WAVE SAW BLADE

BACKGROUND OF THE INVENTION

1. Field of the Invention

The present invention relates to a saw blade for cutting hard workpieces, such as concrete or stone, and more particularly to a saw blade comprising a shank and a plurality of cutting tips attached to the outer circumference of the shank, characterized by improvement of the shape of the shank of the saw blade providing the cutting tips of the saw blade with a rotational force while the cutting tips are securely attached to the shank.

2. Description of the Related Art

As well known to those skilled in the art, a saw blade for cutting workpieces generally comprises a shank of a prescribed diameter and a plurality of cutting tips attached to the outer circumference of the shank. Usually, each of the cutting tips is made of a super-abrasive material which has very high hardness, such as diamond or cubic boron nitride (CBN). The cutting tip may be classified as either a segment-type cutting tip or a rim-type cutting tip, on the basis of the shape with which the cutting tip is attached to the outer circumference of the shank. The segment-type or rim-type cutting tip may have prescribed ribbed portions formed at the front surface of the cutting tip which makes contact with a workpiece and at the side surfaces of the cutting tip which are perpendicular to the front surface of the cutting tip, respectively. The saw blade comprising cutting tips having the aforesaid rugged portions formed thereon is generally called a turbo saw blade.

A cutting device generally comprises a cutting tool for cutting workpieces, a motor for transmitting power to the cutting tool, and an electrical and mechanical apparatus connected to the motor. The saw blade is a kind of cutting tool. The saw blade comprises a shank, which is composed of a disc-shaped body made of prescribed alloy steel, and a plurality of cutting tips attached to the outer circumference of the shank.

The cutting tips are the part of the saw blade which serves to cut the workpiece. Each of the cutting tips is made of a mixture of a super-abrasive material and a bonding agent, the mixture is brought to a high level of wear resistance by processing at elevated temperature with or without pressure such that the cutting tips are fully dense. The super-abrasive material is a material with high hardness, such as diamond or cubic boron nitride (CBN). The bonding agent is composed of metal powder serving to maintain the attachment of the super-abrasive material to the cutting tips, and to assist continuous regeneration of the super-abrasive material in the course of cutting the workpiece.

The cutting tip may be classified as either a segment-type cutting tip or a rim-type cutting tip. The segment-type cutting tip is composed of a sector member having prescribed length, width and height, which is attached to the outer circumference of the shank. The rim-type cutting tip is composed of a ring-shaped member having prescribed width and height, which is also attached to the outer circumference of the shank.

FIG. 1 is a plan view of a conventional saw blade 10. As shown in FIG. 1, the saw blade 10 generally comprises a shank 11 and a plurality of cutting tip 14. The shank 11 is provided at the center thereof with a hole 19 of a prescribed diameter, through which a rotating shaft of a powered tool (not shown) is inserted so that a rotational force from the powered tool is transmitted to the shank 11 via the rotating shaft of the powered tool. The shank 11 is also provided at the outer circumference thereof with a plurality of spaced slots 17, which are uniformly spaced apart from each other by units of the length of the curved cutting tips 14 attached to the outer circumference of the shank 11, so that a prescribed number of the cutting tips 14 are uniformly attached to the outer circumference of the shank 11. The slots 17 serve as passageways through which cooling water is supplied to the saw blade when the workpiece is cut by the saw blade in a wet cutting fashion.

The saw blade 10 with the above-stated construction is manufactured as follows: A super-abrasive material, such as diamond or cubic boron nitride (CBN), and a bonding agent, such as a metal powder, are uniformly mixed to provide a compound of the super-abrasive material and the bond. The compound is poured into a prescribed mold where the compound is compressed, compacted, and sintered to obtain a segment-type or rim-type cutting tip. The cutting tip is attached to the outer circumference of the shank having a prescribed diameter, through silver soldering, welding and sintering processes, whereby a saw blade for cutting workpieces is finally manufactured.

The operation of the saw blade with above-stated construction will now be described. The saw blade is attached to the shaft of a powered tool (not shown) in such a manner that a rotating shaft of the powered tool is inserted into the hole 19 formed at the center of the shank 11 of the saw blade 10. When the powered tool is operated, the shank 11 of the saw blade 10 now securely attached to the rotating shaft of the powered tool is rotated. The rotational force from the shank 11 of the saw blade 10 is transmitted to the cutting tips 14 attached to the outer circumference of the shank 11 of the saw blade 10. When the cutting tips 14 of the saw blade 10 are rotated, a cutting force and a frictional force are generated from the super-abrasive material particles and bond. The workpiece, such as stone or concrete, is cut by means of the cutting force while the cutting tips 14 of the saw blade 10 are rotated.

The cutting force and the frictional force generated between the cutting tips 14 of the saw blade 10 and the workpiece are directly transmitted to the shank 11 of the saw blade 10. The shank 11 of the saw blade 10 vibrates in the direction perpendicular to the cutting direction of the saw blade 10 by means of these forces transmitted to the shank 11 of the saw blade 10. When the cutting force generated in the course of cutting the workpiece is transmitted in the direction of cutting the workpiece, no vibration is generated. When the shank 11 of the saw blade 10 is moved or vibrated in the direction perpendicular to the cutting direction of the saw blade 10 in the course of cutting the workpiece, however, the cutting force is directly transmitted to the shank 11 of the saw blade 10 in the direction perpendicular to the cutting direction of the saw blade 10, whereby large vibration is caused.

When the saw blade 10 is continuously rotated at a high speed of several thousand RPM to cut the workpiece in a dry cutting fashion, the shank 11 of the saw blade 10 is heated to a temperature of several hundred degrees. When the shank 11 of the saw blade 10 is instantaneously heated as mentioned above, the strength of the shank is decreased even though the shank is made of alloy steel. Consequently, the shank 11 of the saw blade 10 vibrates from side to side. When the shank 11 of the saw blade 10 vibrates widely, the shank 11 may be broken or the cutting tips 14 attached to the outer circumference of the shank 11 may be broken off from the shank 11 of the saw blade 10 with the result that a an accident may be caused, for example, an operator of the saw blade may be injured in the course of cutting the workpiece.

In order to solve the aforesaid problems, the prior art includes an improved saw blade which is capable of withstanding the forces transmitted when the workpiece is cut by the saw blade, is shown in FIGS. 3 and 4. The saw blade of FIG. 3 has ribbed portions formed on the shank of the saw blade. The ribbed portions are radially formed from the vicinity of the center of the shank to the outer circumference of the shank in the shape of waves.

As can be seen from FIG. 3, the saw blade 20 has ribbed portions radially formed from the center thereof to the outer circumference thereof. The saw blade 20 comprises a shank 21 and a plurality of cutting tips 24 attached to the outer circumference of the shank 21. As shown in FIG. 4, the saw blade 20 has upper ribbed portions 26 and lower ribbed portions 27, which are radially formed from the center of the shank 21 to the cuttings tip 24 of the saw blade 20.

When a workpiece is cut by the saw blade 20, the cutting tips 24, which make contact with the workpiece, absorb the cutting force, by which the shank 21 of the saw blade 20 is caused to vibrate. When the impact is applied to a straight shank of the saw blade, the shank vibrates seriously. When the impact is applied to a shank of the saw blade having the ribbed portions formed thereon as shown in FIG. 4, however, the vibration of the shank is decreased.

As mentioned above, the cutting force is dispersed in the course of cutting the workpiece by using the saw blade 20 of FIG. 3. However, no clearance is provided at the end part of the outer circumference of the shank 21 of the saw blade 20, which causes friction between the shank 21 and the workpiece. As a result, a frictional load may be induced. The vibration of the saw blade 20 is more serious when the saw blade 20 is attached to a handheld tool giving the possibility that the frictional load induced may be higher. Furthermore, the vibration of the shank is negligible when the shank of the saw blade is small, for example, below 9 inches in diameter. As the diameter of shank of the saw blade is increased the possibility increases that a frictional load will occur between the workpiece and the shank due to the vibration of the shank.

When the frictional load is caused as mentioned above, the cutting speed of the saw blade, which is the most important factor in a small tool, is decreased. Furthermore, the shank is worn and heated due to continuous friction between the shank and the workpiece, whereby the shank may be deformed due to the forces during the cutting work. The result is that an accident may occur.

SUMMARY OF THE INVENTION

Therefore, the present invention has been made in view of the above problems, and it is an object of the present invention to provide a saw blade which is capable of withstanding the cutting force in the course of cutting a workpiece, reducing vibration generated in the course of cutting the workpiece, and preventing accumulation of fatigue in the saw blade by increasing the mechanical strength and stiffness of the shank of the saw blade.

It is another object of the present invention to provide a saw blade which is capable of preventing direct contact between a shank of the saw blade and a workpiece to reduce friction between the shank and the workpiece, thereby increasing the cutting speed of the saw blade.

In accordance with the present invention, the above and other objects can be accomplished by the provision of a saw blade comprising: a disc-shaped shank having an insertion hole formed at the center thereof so that a rotating shaft of a powered tool is inserted through the insertion hole of the shank, and wave-shaped portions formed over a prescribed portion of the radius of the disc-shaped shank, the wave-shaped portions being spaced a prescribed distance from each other and alternately arranged on the front and rear surfaces of the disc-shaped shank, the prescribed portion of the radius of the disc-shaped shank being at a distance from the center of the insertion hole; and a plurality of cutting tips attached to the outer circumference of the shank for cutting a workpiece, the cutting tips containing particles of high hardness.

Preferably, the prescribed portion of the radius of the disc-shaped shank is more than the radius of the insertion hole and less than the radius of the outer peripheral part of the saw blade formed by attaching the cutting tips to the shank.

Preferably, the height of each of the prominences of the wave-shaped portions of the shank is less than the height of the front or rear prominence of each of the cutting tips.

Preferably, the wave-shaped portions of the shank comprise a plurality of rings formed so that the rings are alternately arranged on the front and rear surfaces of the disc-shaped shank. Alternatively, the wave-shaped portions of the shank may be formed in a helical fashion.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
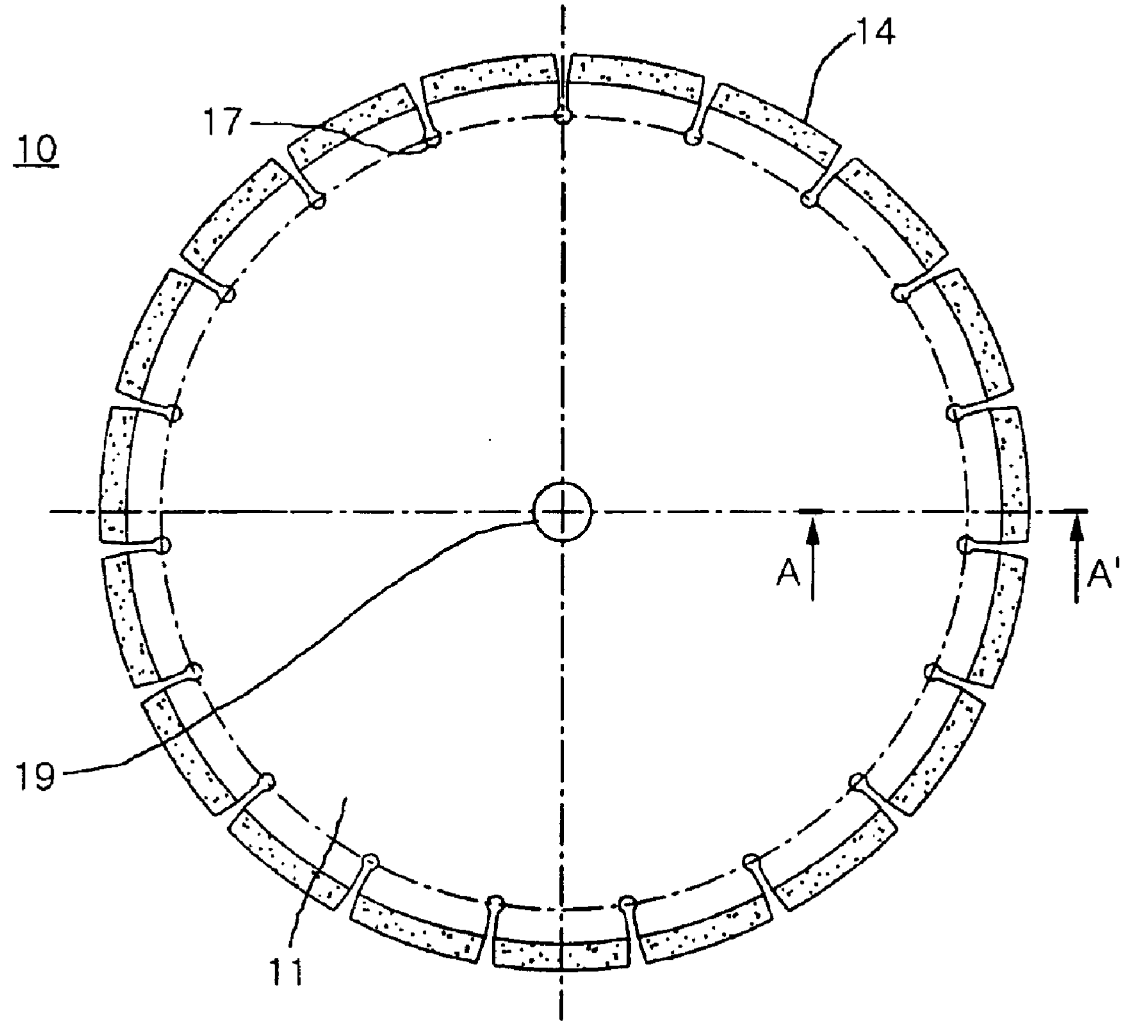
PRIOR ART FIG. 1
FIG. 1 is a plan view of a conventional saw blade with a plurality of cutting tips of the saw blade attached to a straight shank of the saw blade.
Figure 2:
PRIOR ART FIG. 2
FIG. 2 is a cross-sectional view of the conventional saw blade taken along line A-A' of FIG. 1.
Figure 3:
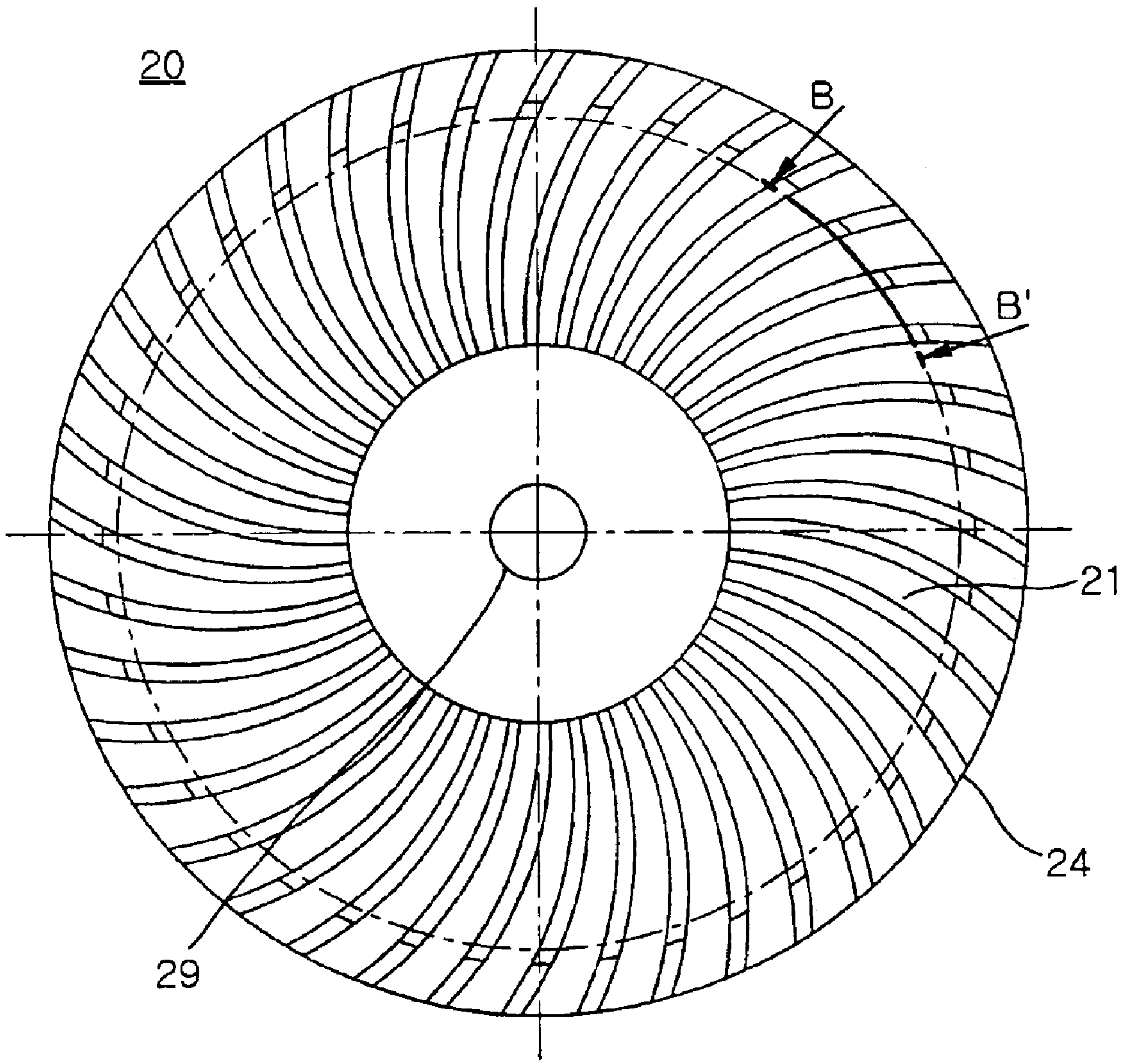
PRIOR ART FIG. 3
FIG. 3 is a plan view of another conventional saw blade with a plurality of cutting tips of the saw blade attached to a wave shank of the saw blade.
Figure 4:
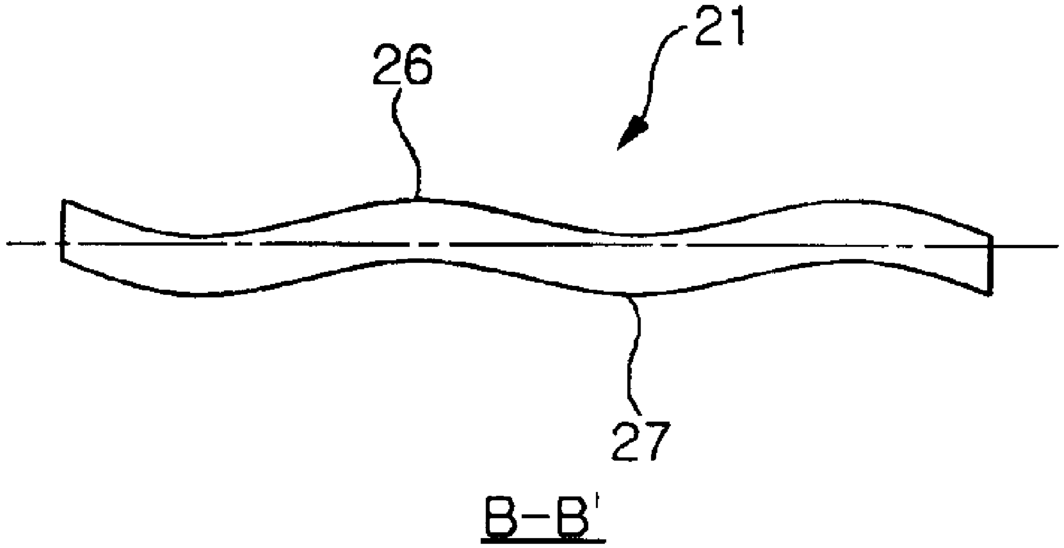
PRIOR ART FIG. 4
FIG. 4 is a cross-sectional view of the conventional saw blade taken along line B-B' of FIG. 3.
Figure 5:
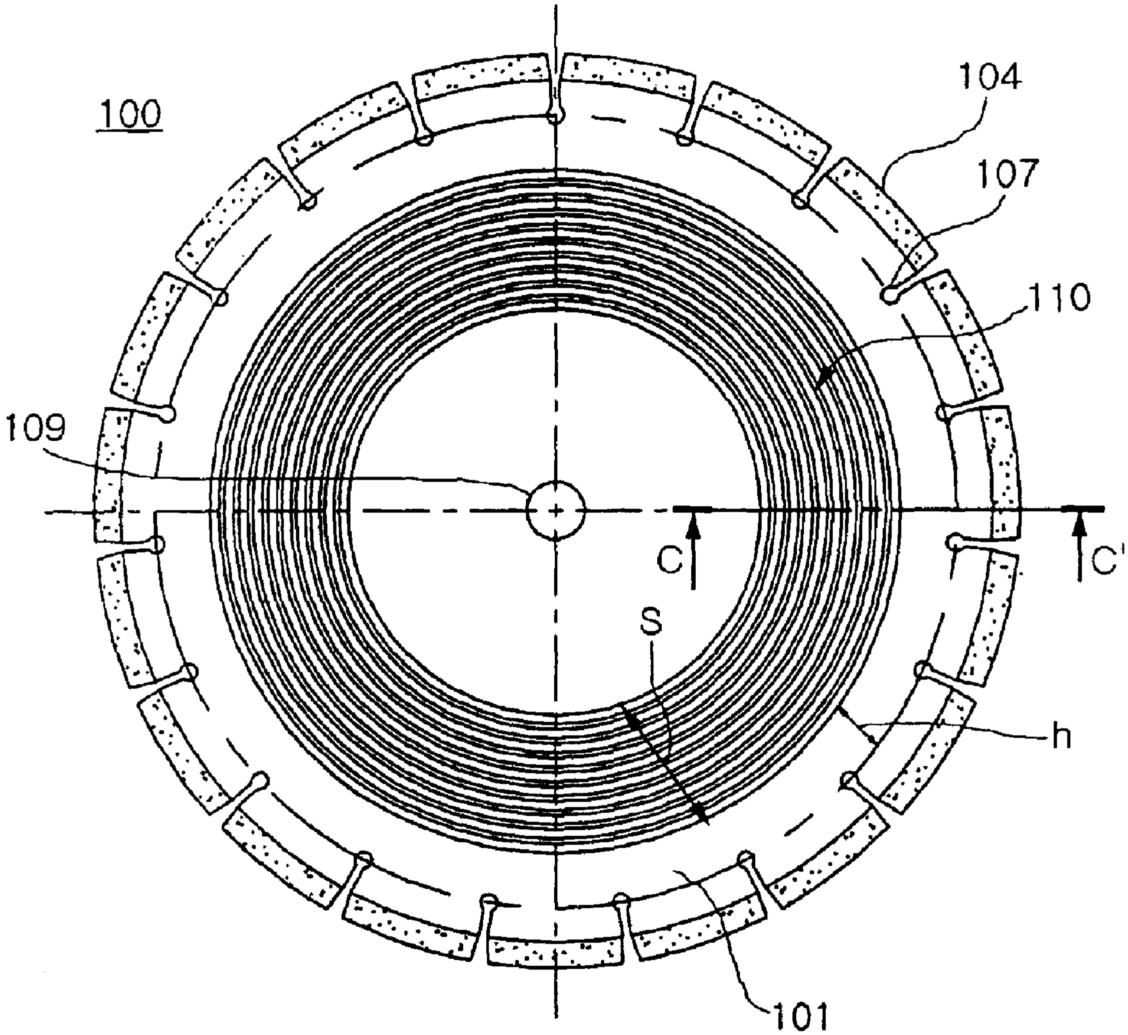
FIG. 5 is a plan view of a saw blade according to a preferred embodiment of the present invention with a plurality of cutting tips of the saw blade attached to a ring-shaped wave shank of the saw blade.
Figure 6:
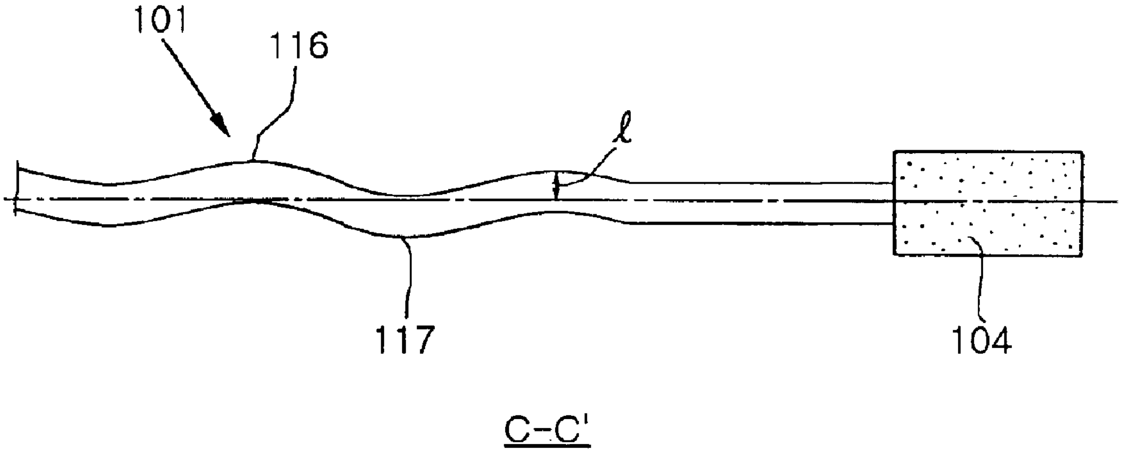
FIG. 6 is a cross-sectional view of the saw blade according to the preferred embodiment of the present invention taken along line C-C' of FIG. 5.

FIG. 5 is a plan view of a saw blade according to a preferred embodiment of the present invention with a plurality of cutting tips of the saw blade attached to a ring-shaped wave shank of the saw blade, and FIG. 6 is a cross-sectional view of the saw blade according to the preferred embodiment of the present invention taken along line C-C' of FIG. 5.

As shown in FIG. 5, a saw blade 100 of the present invention comprises a shank 101 having wave-shaped portions formed thereon, and a plurality of cutting tips 104 attached to the outer circumference of the shank 101 for cutting a workpiece (not shown). The shank 101 is a disc-shaped shank having a prescribed radius of rotation and a prescribed thickness. The shank 101 is made of prescribed alloy steel. The shank is provided at the center thereof with an insertion hole 109, through which a rotating shaft of a powered tool (not shown) is inserted.

The shank 101 is also provided at the outer circumference thereof with a plurality of spaced slots 107, which are formed at a prescribed depth from the outer circumference of the shank 101 and uniformly spaced apart from each other by unit of the length of the curved cutting tips 104 attached to the outer circumference of the shank 101, so that a prescribed number of the cutting tips 104 are uniformly attached to the outer circumference of the shank 11. To the outer circumference of the shank divided by the slots 107 are securely attached the cutting tips 104.

Each of the cutting tips 104 is made of a mixture of super-abrasive material with high hardness, such as diamond or cubic boron nitride (CBN), and a bonding agent. The mixture of the super-abrasive material and the bonding agent is compressed, compacted, and sintered in a mold, whereby the cutting tips 104 are finally obtained. The cutting tips 104 may be formed in the shape of the segment-type cutting tips or the rim-type segment cutting tips, as mentioned above. The cutting tips 104 manufactured as mentioned above are subject to silver soldering, welding and sintering processes so that the cutting tips 104 are attached to the outer circumference of the shank 101 of the saw blade 100.

Wave-shaped portions 110 are formed on the shank 101 of the saw blade 100 according to the present invention. The wave-shaped portions 110 are formed over a prescribed portions of the radius of the shank 101, and are spaced a prescribed distance from each other and alternately arranged on the front and rear surfaces of the shank 101. The aforesaid prescribed portions of the radius of the shank 101 is spaced at a distance from the center of the insertion hole 109.

The wave-shaped portions 110 of the shank 101 are best shown in FIG. 6, which is a cross-sectional view of the shank 101 taken along line C-C' of FIG. 5. The shank 101 of the saw blade 100 is formed in such a manner that the wave-shaped portions 110 of the shank 101 are alternately arranged on the front and rear surfaces of the shank 101. Specifically, the wave-shaped portions 110 of the shank 101 include front and rear prominences 116 and 117, by which the shank 101 of the saw blade 100 is curved in the shape of a wave.

It should be noted that the wave-shaped portions 110 of the shank 101 are formed over the prescribed portions of the radius of the shank 101, which is at a distance from the center of the insertion hole 109. The prescribed portions of the radius of the shank 101 is more than the radius of the insertion hole 109 and less than the radius of the outer peripheral part of the saw blade 100 formed by attaching the cutting tips 104 to the shank 101. Preferably, the wave-shaped portions 110 are spaced a prescribed distance h from the outer part of the shank 101 where the cutting tips 104 are attached to the shank 101 especially for preventing any friction between the shank 101 and a workpiece when the workpiece is cut by the cutting tip 104 of the saw blade 100.

As seen in FIG. 6, the height 1 of each of the front prominences 116 or the rear prominences of the wave-shaped portions 110 of the shank 101, as measured from a radially extending central axis, is preferably less than the height of the front or rear prominence of each of cutting tips 104, which is required to prevent any friction between the shank 101 and the work surface of the workpiece in the course of cutting the workpiece.

Alternatively, the wave-shaped portions 110 of the shank 101 may comprise a plurality of rings formed on the shank 101 so that the rings are alternately arranged on the front and rear surfaces of the shank 101 of the saw blade 100. In other words, a plurality of concentric circles are alternately formed on the front and rear surfaces of the shank 101 to form the wave-shaped portions 110 of the shank 101. Furthermore, the wave-shaped portions 110 of the shank 101 may be formed from a position near the center of the shank 101 to outer circumference of the shank 101 in a helical fashion. In other words, the front and rear prominences are helically formed while being spaced a prescribed distance from each other and parallel with each other.

The above-mentioned formation of the wave-shaped portions at the shank provides the following effects: the frictional region between the shank and the workpiece is minimized in the course of cutting the workpiece, and no cutting load is directly transmitted since the wave-shaped portions of the shank dispersively absorb the forces applied to the shank. Consequently, the deformation of the shank is minimized and the cutting impact is dispersed even when performing a continuous cutting process or a dry cutting process.

The saw blade is rotated at a speed of several thousand RPM. As a result, the shank of the saw blade may be easily deformed or damaged due to high temperature generated when the side surfaces of the shank rub against the workpiece. A possibility of deformation or damage to the shank may be increased since the shank is vibrated especially when the workpiece is cut in a dry cutting fashion or an operator of the saw blade manually holds the saw blade to cut the workpiece.

Therefore, the present invention provides an improved structure to the shank, by which the cutting and frictional forces generated by the forces and friction between the cutting tips containing the super-abrasive material and the workpiece are minimized in the course of cutting the workpiece.

When the aforesaid wave-shaped portions 110 are formed on the shank 101 of the saw blade 100 as shown in FIG. 5, the wave-shaped portions 110 disperse and absorb the cutting force applied to the shank 101 in the radial direction of the shank 101. That is to say, the force applied to the shank 101 of the saw blade 100 is divided into a horizontal component force and a vertical component force by the wave-shaped portions 110 of the shank 101, and the horizontal component force, which is applied back and forth, is offset since the wave-shaped portions 110 of the shank 101 are symmetrical on the front and rear surfaces of the shank 101, whereby the impact force is absorbed by means of the wave-shaped portions 110 of the shank 101.

When the saw blade 100 is continuously used to cut the workpiece, the shank 101 is cumulatively fatigued due to the cutting load caused by the stress repetitively applied to the shank 101. As a result, the shank 101 is deformed even at the load smaller than the mechanical strength. Consequently, the shank 101 is deformed or damaged, or the cutting tips 104 are detached from the shank 101. However, such a possibility is minimized by the provision of the aforesaid wave-shaped portions 110 of the shank 101 of the saw blade 100.

Furthermore, the provision of the aforesaid wave-shaped portions 110 of the shank 101 of the saw blade 100 provides an effect that cooling water is highly effectively supplied to the saw blade 100 in the course of cutting the workpiece. When the cooling water is not sufficiently supplied to the saw blade, the mechanical strength of the shank is decreased due to high temperature generated by the friction between the shank 101 and the workpiece. In the shank 101 having the wave-shaped portions 110 formed thereon, however, the cooling water is sufficiently supplied to the cutting tips along the wave-shaped portions 110 of the shank 101. Consequently, any deformation or damage to the shank 101, or detachment of the cutting tips 104 from the shank 101 is efficiently prevented.

In addition, the saw blade of the present invention provides the preferable structure in which the mechanical strength against the vibration and the impact caused in the course of cutting the workpiece is increased, and the friction between the shank and the workpiece is minimized.

The wave saw blade of the present invention is characterized in that the right and left vibration of the shank caused by the cutting forces of the workpiece against the shank does not occur in the course of cutting the workpiece. Consequently, direct friction between the shank and the workpiece is minimized with the result that any deformation of the shank due to the impact load or the high temperature is prevented even in the course of continuously cutting the workpiece or dry cutting the workpiece, and the impact caused in the course of cutting the workpiece is absorbed.

In order to verify properties of the material according to the aforesaid structure, a tensile test for the conventional saw blade and the wave saw blade of the present invention was carried out. The result of the tensile test is as follows: the tensile strength of the conventional saw blade was 570 $N/mm^2$, and the tensile strength of the wave saw blade of the present invention was 610 $N/mm^2$, which is approximately 7% higher than that of the conventional saw blade.

Figure 7:
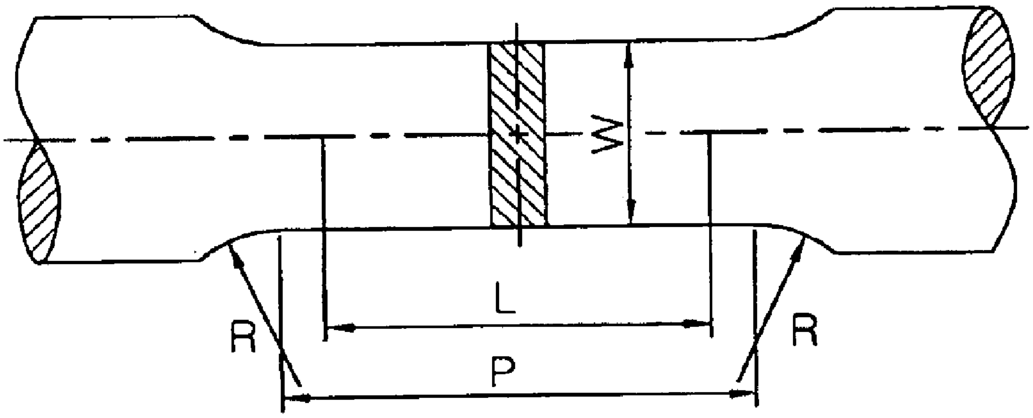
FIG. 7 is a fragmented side view showing various dimensions of a sample for a tensile test.

The tensile test was carried out with a sample having dimensions as shown in FIG. 7. The specific dimensions (mm) of the sample are as follows:

| Width (W) | Mark length (L) | Length of parallel part (P) | Radius of Shoulder (R) |
|---|---|---|---|
| 25 | 50 | Approximately 60 | More than 15 |

The aforesaid tensile test was carried out using a tensile tester manufactured by Zwick GmbH & Co. KG in German, having a capacity of 10 ton. A load was applied to the sample at a loading speed of 5 mm/sec.

Furthermore, the cutting force induced shaking of the sample generated when the sample was actually cut was verified through the experiments. The process of impact vibration experiments was as follows: The impact vibration experiments were carried out using a table saw equipped with a Bosch angle grinder having specifications of 5000 RPM and 2200 W, which is widely used. The impact was instantaneously applied to a granite sample having a thickness of 20 mm using a saw blade whose outer diameter was 350 mm. At this time, the feed speed was 1.5 to 2.0 m/min. After the instantaneous impact was applied to the granite sample, the saw blade was separated from the granite sample to measure the vibration width of the saw blade using a transparent scale. The result of measurement of the vibration width (mm) of the saw blade was given in Table 1.

TABLE 1

| | Conventional saw blade | | Wave saw blade | |
|---|---|---|---|---|
| Type | Heat treated | Not treated | Heat treated | Not treated |
| Vibration width | ±3 | ±5 | ±1 | ±1 |

The conventional saw blade vibrated from side to side up to 5 mm immediately after it came into contact with the granite sample. On the other hand, the wave saw blade of the present invention vibrated from side to side by approximately 1 mm, which was smaller than the vibration width of the conventional saw blade. The aforesaid result of the experiments reveals that the wave saw blade of the present invention is vibrated negligibly from side to side as compared to the conventional saw blade. For reference, the hardness of each of the heat-treated shanks of the saw blades was approximately HRC 33 to 39, and the hardness of each of the untreated shanks of the saw blades was HRB 85 to 105. The material for each of the shanks of the saw blades was low-carbon steel SCM3.

Furthermore, the cutting tests for the conventional saw blade having a straight shank and the wave saw blade of the present invention were carried out. The specification of each of the tested saw blades was as follows: The thickness of the cutting tip was 3.2 mm, and the length of the cutting tip was 40 mm. 100% cobalt was used as a bond, and a compound of 50% of a diamond product having a grain size of 40/50 and a concentration of 23, which was manufactured and sold under the trademark of ISD-1650 by ILJIN Diamond Co., Ltd. in Korea, and 50% of another diamond product having a grain size of 30/40 and a concentration of 23, which was the same grade as the ISD-1650 diamond product, was used as a super-abrasive material. The cutting tips were attached to the outer circumference of the shank by laser welding. A concrete sample having a compression strength of approximately 300 $kgf/cm^2$ was used as the workpiece. The saw blade was manually moved at a cross feed of 35 mm. The workpiece was cut by units of 30 cm in length, and the cutting processes were repeated 50 times so that the cut length of the workpiece amounted to 15 m. The results of the cutting tests showed that the cutting speed of the conventional saw blade was 733 $cm^2/min$, and the cutting speed of the wave saw blade having the ring-shaped wave shank of the present invention was 896 $cm^2/min$. As can be seen from the results of the cutting tests, the cutting speed of the wave saw blade of the present invention is 22% faster than that of the conventional saw blade.

The wave saw blade of the present invention is capable of preventing the occurrence of the vibration of the shank in the cutting direction and the direction perpendicular to the cutting direction to increase the cutting speed, and narrowly cutting a workpiece so that the workpiece is precisely cut. Consequently, no chipping is generated even when a hard granite or marble product, in which the roughness at its cut surface is critical, is cut, and thus a final product of high quality can be obtained.

With the conventional saw blade, cooling water is not sufficiently supplied to the cutting tips of the saw blade in the course of wet cutting the workpiece because of turbulence generated as the saw blade is rotated at a rotating speed of several thousand RPM. The cooling water is rather volatile outside the saw blade. With the saw blade having the aforesaid wave shank of the present invention, however, a rotating force is given to the cooling water so that the cooling water is uniformly supplied to the cutting tips. Consequently, it is possible to efficiently remove chips of the workpiece using a small amount of cooling water, and to improve the cutting efficiency.

As apparent from the above description, the present invention provides a saw blade which is capable of preventing direct transmission of an impact force to a shank of the saw blade in the course of cutting a workpiece, thereby dispersing and absorbing the impact force.

The present invention also provides a saw blade whose mechanical strength is considerably increased. Consequently, the shank does not vibrated vibrate from side to side even though the shank is subject to a temperature of several hundred degrees caused by the friction between the shank rotating at high speed and the workpiece, and accumulation of fatigue on the saw blade is prevented.

With the saw blade of the present invention, it is possible to cut the workpiece while the shank of the saw blade is maintained straight even when it is continuously used in a dry cutting fashion, whereby the cutting speed of the saw blade is faster. Also, the vibration of the saw blade from side to side is prevented, whereby the cutting tips attached to the outer circumference of the shank of the saw blade are not broken off from the shank of the saw blade with the result that an accident cannot occur.

Furthermore, the shank of the saw blade of the present invention does not directly make contact with the cut surface of the workpiece, whereby the friction between the shank of the saw blade and the workpiece is decreased. Generation of impact and high temperature at the shank is also prevented, whereby the service life of the saw blade is increased and the cutting efficiency of the saw blade is improved. In the case of products in which the roughness at its cut surface is critical, no chipping is generated, and thus final products of high quality can be obtained.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A saw blade comprising:

a disc-shaped shank having an insertion hole formed at the center thereof so that a rotating shaft of a powered tool is inserted through the insertion hole of the shank, and wave-shaped portions formed over a prescribed portion of the radius of the disc-shaped shank, the wave-shaped portions being spaced a prescribed distance from each other and alternately arranged on the front and rear surfaces of the disc-shaped shank, the prescribed portion of the radius of the disc-shaped shank being at a distance from the center of the insertion hole; and a plurality of cutting tips attached to the outer circumference of the shank for cutting a workpiece, the cutting tips containing particles of high hardness, wherein the shank at its outer circumference has a plurality of spaced slots uniformly spaced apart from each other to provide an attachment site for the cutting tips, and wherein the wave-shaped portions of the shank comprise a plurality of rings formed on the shank so that the rings are alternately arranged on the front and rear surfaces of the disc-shaped shank.

2. The blade as set forth in claim 1, wherein the prescribed portion of the radius of the disc-shaped shank is more than the radius of the insertion hole and less than the radius of the outer peripheral part of the saw blade formed by attaching the cutting tips to the shank.

3. The blade as set forth in claim 1, wherein the wave-shaped portions and the cutting tips each have front and rear prominences outwardly extending from a plane passing through the blade to define a height of each of the prominences, and wherein the height of each of the prominences of the wave-shaped portions of the shank is less than the height of the front or rear prominence of each of the cutting tips.

* * * * *

UNITED STATES PATENT AND TRADEMARK OFFICE

CERTIFICATE OF CORRECTION

PATENT NO. : 6,872,133 B2 
DATED : March 29, 2005
INVENTOR(S) : Lee et al.

It is certified that error appears in the above-identified patent and that said Letters Patent is hereby corrected as shown below:

Column 2,
Line 67, "that a an" should read -- that an --.

Column 5,
Lines 32 and 35, "portions of the radius" should read -- portion s of the radius --.

Column 7,
Line 67, "was given in Table 1" should read -- is given in Table 1 --.

Column 9,
Line 14, "does not vibrated vibrate" should read -- does not vibrate --.

Signed and Sealed this

Eleventh Day of October, 2005

JON W. DUDAS
*Director of the United States Patent and Trademark Office*